: US008963688B2

(12) United States Patent
Fenkanyn et al.

(10) Patent No.: US 8,963,688 B2
(45) Date of Patent: Feb. 24, 2015

(54) STACKED TIRE RFID READER SYSTEM AND METHOD

(75) Inventors: John Michael Fenkanyn, Akron, OH (US); Joseph Paul Batcho, Sr., Warren, OH (US); Mario Vincent Orosa, North Canton, OH (US); Jennifer Kaye Flowers, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 213 days.

(21) Appl. No.: 13/589,423

(22) Filed: Aug. 20, 2012

(65) Prior Publication Data

US 2014/0049375 A1 Feb. 20, 2014

(51) Int. Cl.
*H04Q 5/22* (2006.01)
*G08C 19/12* (2006.01)
*B60C 19/08* (2006.01)

(52) U.S. Cl.
USPC .............. 340/10.1; 340/10.32; 340/13.26; 152/152.1

(58) Field of Classification Search
CPC ............ B60C 9/00; B60C 23/00; G06F 7/00; G06F 17/00; G01B 21/16; H04Q 9/00; G08C 19/22; G01V 3/00; E21B 19/16; E21B 47/01
USPC .......................................................... 340/10.1
See application file for complete search history.

(56) References Cited

U.S. PATENT DOCUMENTS

| | | | |
|---|---|---|---|
| 4,808,925 A * | 2/1989 | Baird ............................ 324/221 |
| 5,500,651 A * | 3/1996 | Schuermann ................... 342/42 |
| 5,720,345 A * | 2/1998 | Price et al. ................. 166/254.2 |
| 6,257,289 B1 * | 7/2001 | Tomita et al. ............... 152/152.1 |
| 6,975,205 B1 * | 12/2005 | French et al. ................. 340/5.92 |
| 7,971,487 B2 * | 7/2011 | Carlen et al. ..................... 73/760 |
| 8,502,677 B2 * | 8/2013 | Pintos et al. ............... 340/572.7 |
| 2006/0113374 A1 * | 6/2006 | Taylor et al. ................. 235/376 |
| 2007/0273531 A1 * | 11/2007 | Ando et al. ................. 340/572.7 |
| 2008/0238678 A1 * | 10/2008 | De Castro et al. ......... 340/572.1 |
| 2009/0096611 A1 * | 4/2009 | Jones ......................... 340/572.7 |
| 2010/0013664 A1 * | 1/2010 | Zierolf ....................... 340/854.6 |

FOREIGN PATENT DOCUMENTS

| EP | 2178051 | 4/2010 | ............... G07C 5/08 |
|---|---|---|---|
| EP | 2680188 | 1/2014 | ............... H01Q 1/22 |
| JP | 2005170065 | 6/2005 | .......... B60C 23/0472 |

OTHER PUBLICATIONS

European Search Report received by Applicants Apr. 18, 2014.

* cited by examiner

*Primary Examiner* — Jennifer Mehmood
*Assistant Examiner* — John Mortell
(74) *Attorney, Agent, or Firm* — Richard B. O'Planick

(57) ABSTRACT

A product management system and method for reading electronic identification tags from a vertical stack of tires. Each tire has an electronic identification tag secured at a position to operative to electronically transmit data to an antenna element positioned internally within a toroidal opening of each tire in the stack. An elongate read wand is positioned in a substantially vertical orientation within the aligned toroidal openings of the tires. The antenna element is carried by the read wand and is thus positioned by the read wand to receive an electronic transmission from each electronic identification tag in the aligned tire stack. The read wand may be ceiling-mounted, floor mounted, or hand held.

13 Claims, 16 Drawing Sheets

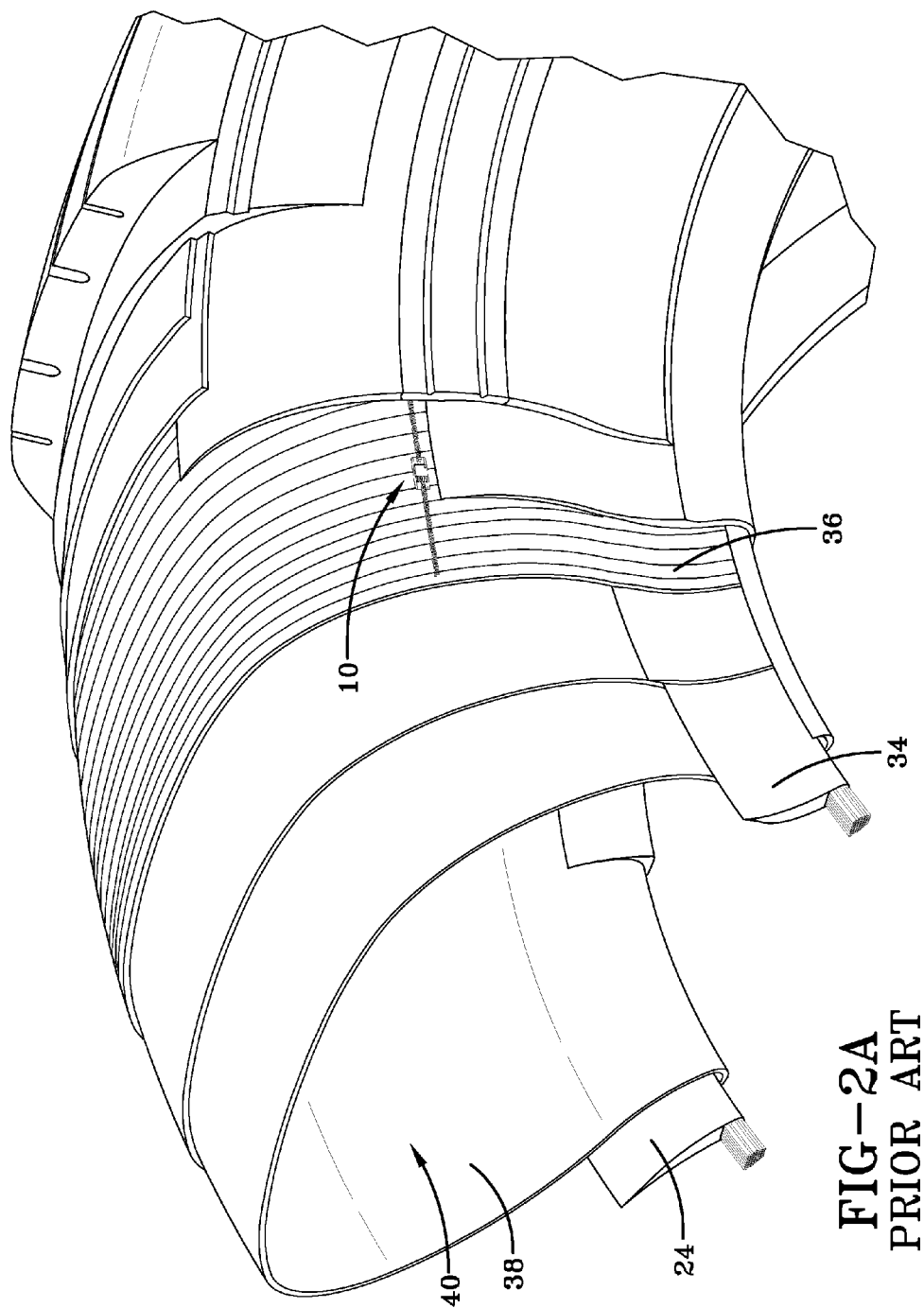

STACKED TIRE RFID READER SYSTEM AND METHOD

FIELD OF THE INVENTION

The present invention relates generally to tires having a readable RFID identification tag incorporated therein and, more specifically, to a reader system and method for reading RFID tags in a stacked array of such tires.

BACKGROUND OF THE INVENTION

It is useful to incorporate an RFID identification tag into a tire in order to enable an identification of the tire throughout the useful service life of the tire. Such tags age affixed to the tire either during pre-cure tire build or during a post-cure tag attachment procedure. Such tires are manufactured by generally conventional factory techniques and are shipped from the factory either to a designated automobile original equipment manufacturer (OEM) or to a tire dealer for use as a replacement tires. In the course of post-manufacture handling, the tires are typically stacked and moved by forklift trucks with a metal clamp to hold the stack of tires. Tires are then moved through a warehouse and pass either through dock doors for loading onto trailers/trucks or move through alternative warehouse openings to other shipping points of deportation.

SUMMARY OF THE INVENTION

A toroidal product management system for reading an electronic identification tag is provided for a single toroidal manufactured product such as a tire, or a vertical stack of such tires. Each tire(s) has an electronic identification tag secured at a position to operatively electronically transmit data to an antenna element positioned internally within a toroidal opening of the tire(s). A read station is positioned to accept the tire(s) therein. An elongate read wand is positioned in a substantially vertical orientation within the read station and sized to operatively extend into the toroidal opening(s) of the tire (s). The antenna element carried by the read wand is thus proximally positioned to receive an electronic transmission from each electronic identification tag(s) within the aligned tire stack.

According to another aspect of the invention, the read wand may, at the election of the user, be mounted in chandelier fashion to hang from the ceiling of the read station, floor mounted to project upwardly from the floor of the read station or handheld. The read wand carrier body is alternatively configured as a flexible strip in which the antenna element is embedded within or as an elongate rigid body supporting the antenna element.

In yet another aspect, a method for utilizing the read system is provided, including the steps: attaching an electronic identification tag secured to a single or plurality of stacked toroidal products such as tires at a position operative to electronically transmit data to an antenna element, each of the toroidal tire(s) having a toroidal opening and the stack of tires having aligned toroidal openings; positioning a read station to accept the toroidal stack of tires therein; positioning an elongate read wand within the read station in a substantially vertical orientation, the read wand having an antenna element secured thereto to receive an electronic transmission from the electronic identification tags of the stacked tires; positioning the read wand within the aligned toroidal openings of the tires; and placing the antenna element of the read wand into a reading proximity with the identification tags of the stacked tires.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 2A is a perspective cut-away view of tire showing upper side wall RFID tag location.

DETAILED DESCRIPTION OF THE INVENTION

Figure 1:
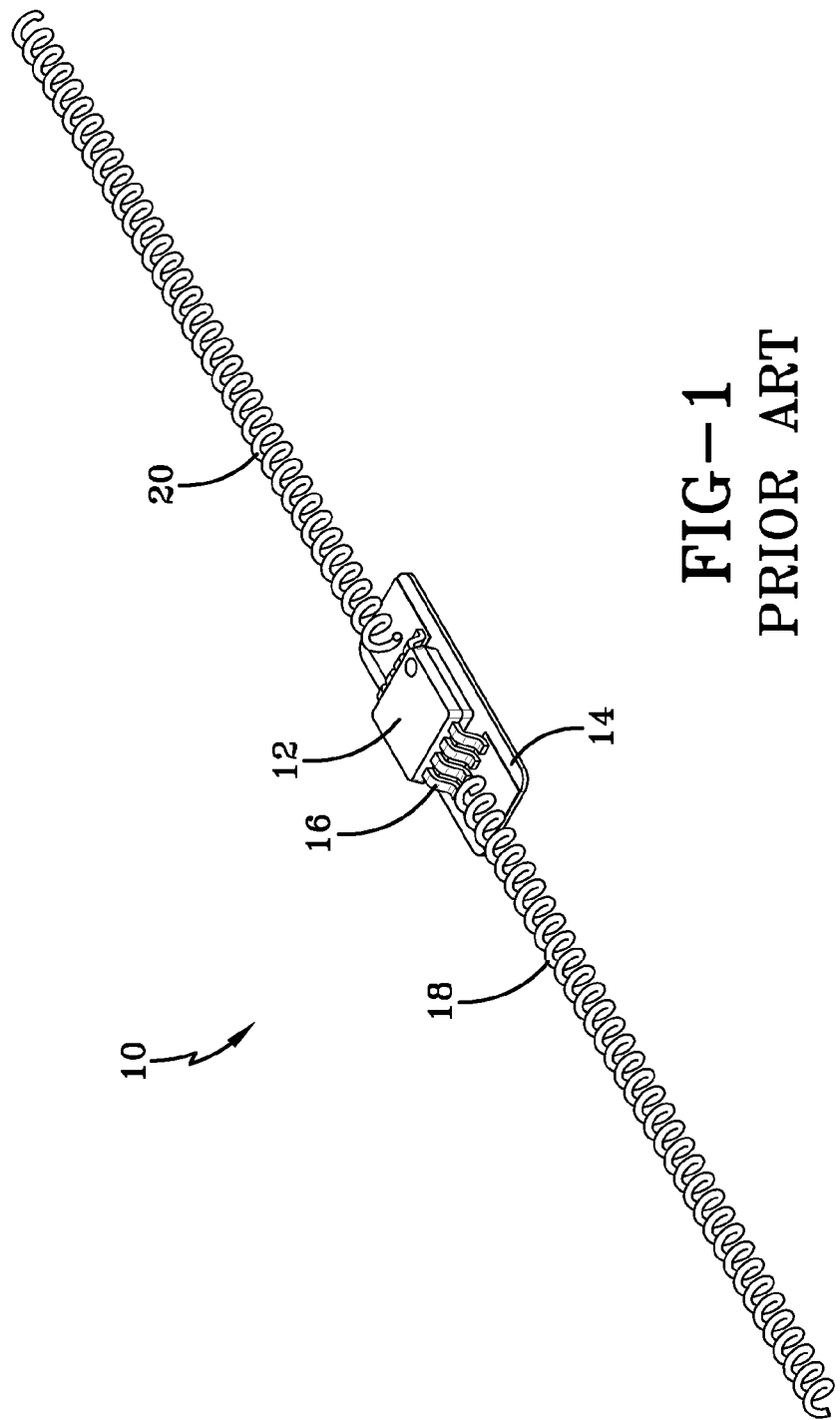
FIG. 1 is a perspective view of known RFID tag.
Figure 3:
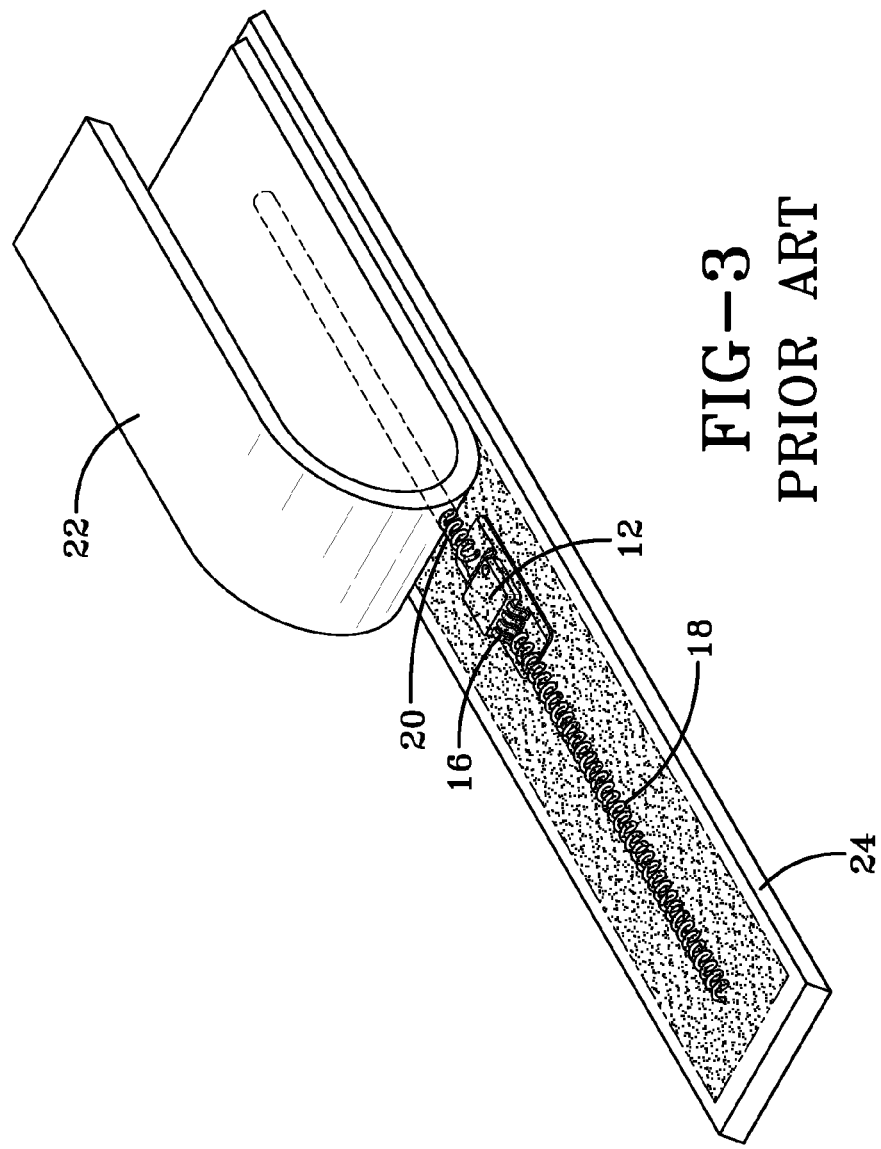
FIG. 3 is a perspective view of RFID tag laminated between 2 rubber strips.

Referring to FIGS. 1 and 3, the use of RFID tags such as tag 10 in toroidally-configured products such as a tires for the purpose of enabling an electronic identification of the product is well know. Such tags are affixed to or embedded into a product in a manufacturing or post-manufacturing procedure and remain with the product during post-manufacture handling, shipping, the supply chain, and even use of the product throughout its useful service life. Because, in certain products such as tires, RFID tags may be embedded into the tire during tire manufacture, the RFID tags may have a limited performance range, making it necessary that a reader antenna be brought into close enough proximity to excite the tag. A toroidal product management system is shown as follows which provides sufficient RF power to excite RFID tags, mechanical robustness to withstand years of use, ease of installation and compatibility with existing RFID readers/eNodes. While the particular product read system for reading RFID tags is shown in the context of tire manufacture and management, it will be appreciated that the invention is not so limited. Other toroidal products may employ the product reading system teachings herein set forth in a variety of manufacturing applications.

Figure 2B:
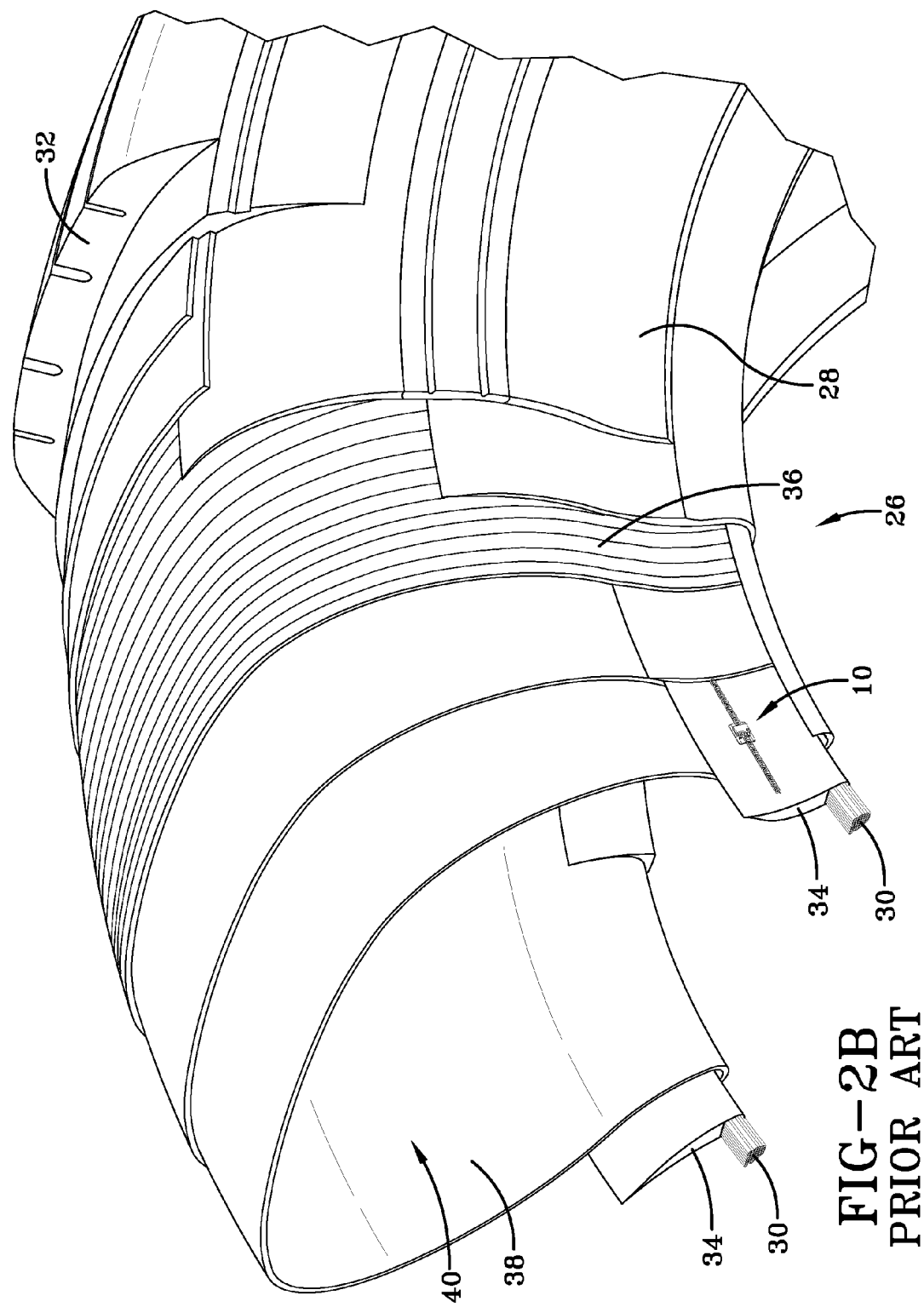
FIG. 2B is a perspective cut-away view of tire showing apex area RFID tag location.

FIGS. 1 and 3 show an RFID tag 10 constructed having an electronic package 12 mounted to a substrate 14 with contacts 16 of the RFID electronics coupled to dipole antennas 18, 20. The tag construction 10 is sandwiched between two strips 22, 24 of protective material such as plastic, with the tag 10 affixed by a layer of adhesive 26 between the strips 22, 24. The completed tag assembly is suitable for incorporation into a myriad products including a tire 26 as shown in FIGS. 2A and 2B. The tire 26 is of conventional construction having a pair of sidewalls 28 extending from dual bead components 30 to a tire tread 32. A pair of chafer components 34 are positioned adjacent respective beads 30. The tire is further constructed having one or more reinforcement plies 36 and an inner liner component 38 which surrounds the tire air cavity 40.

Figure 4:
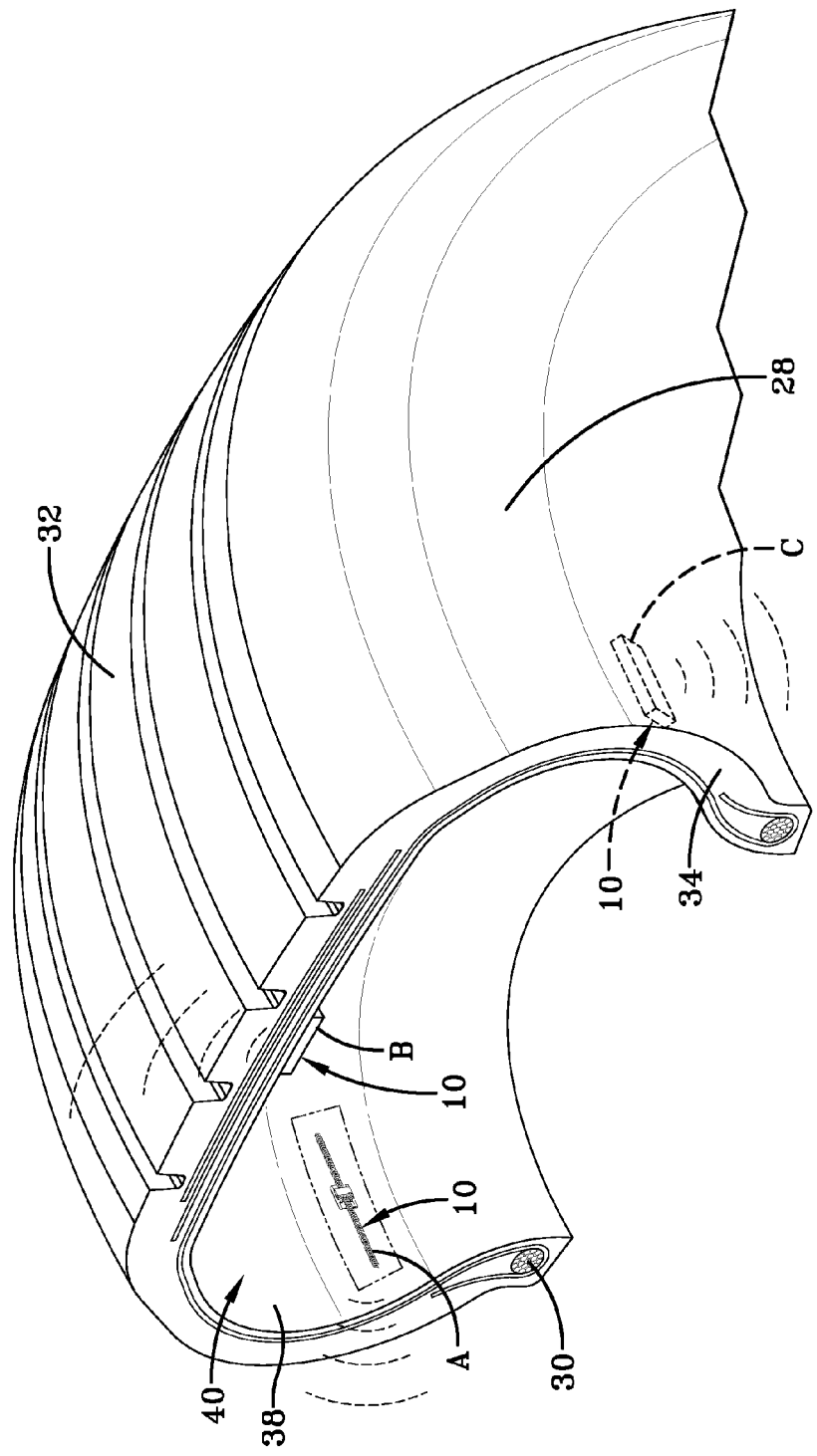
FIG. 4 is a perspective view of RFID tag locations for tags used in FIG. 3.

The tag 10 may be affixed in several manners and at several alternative locations on the tire 26. FIG. 2A shows a placement of the tag 10 against a reinforcement ply 36 during tire build. Alternatively, the tag 10 may be placed during tire construction against a chafer component 34 as shown in FIG. 2B. In a post-manufacture attachment, the tag 10 may be placed and affixed by adhesive to the tire in several locations such as location "A" against inner liner 38 sidewall region as shown in FIG. 4 or location "B" against the inner liner crown region. Location "C" shows the incorporation of the tag against the chafer component as shown in FIG. 2B. One or more tags may be incorporated into the tire in the locations shown or other locations of the tire.

Figure 8A:
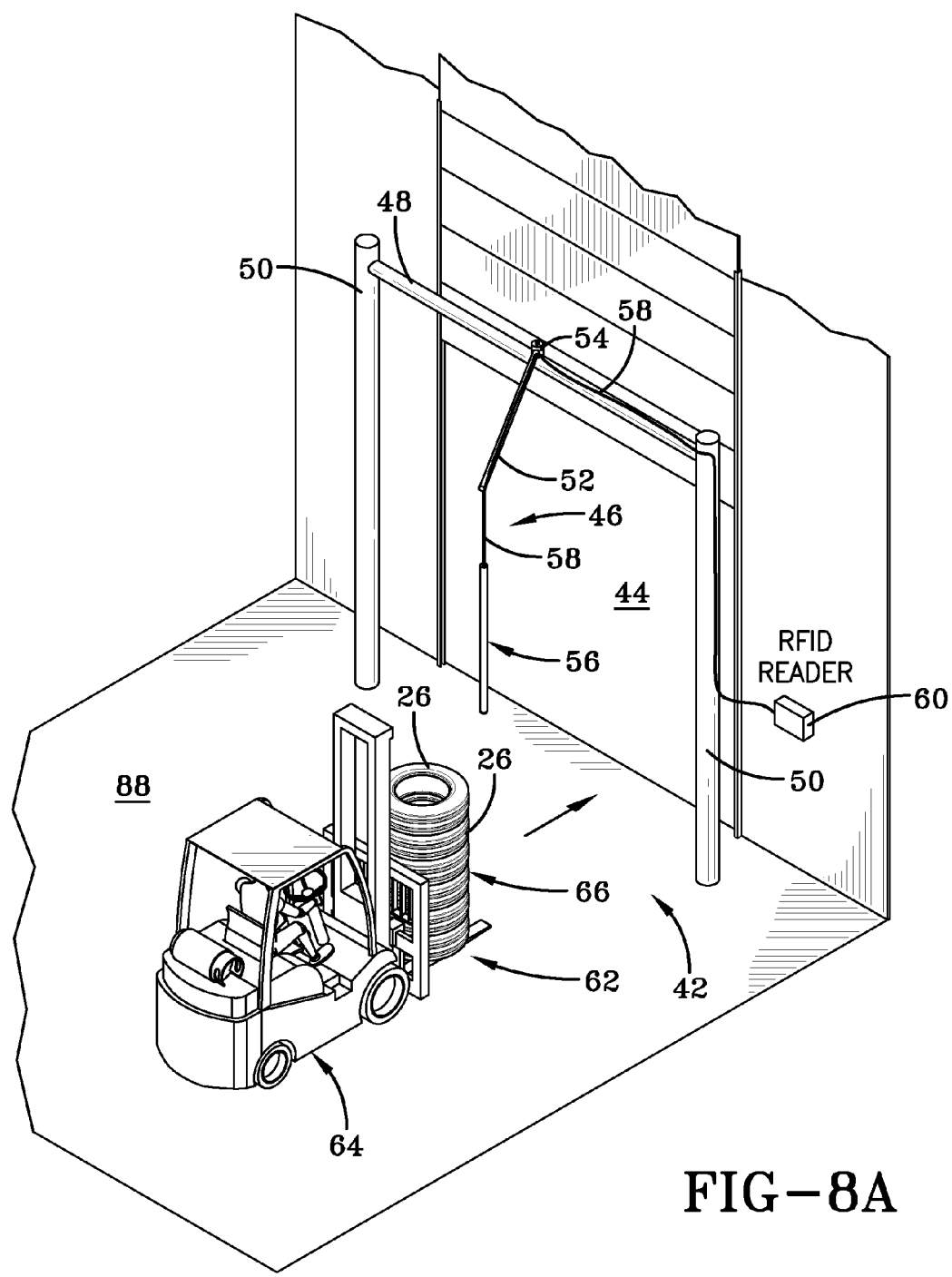
FIG. 8A is a perspective view of forklift with tire stack and a rigged hanging antenna mounted from a swing arm attached to door frame.
Figure 8B:
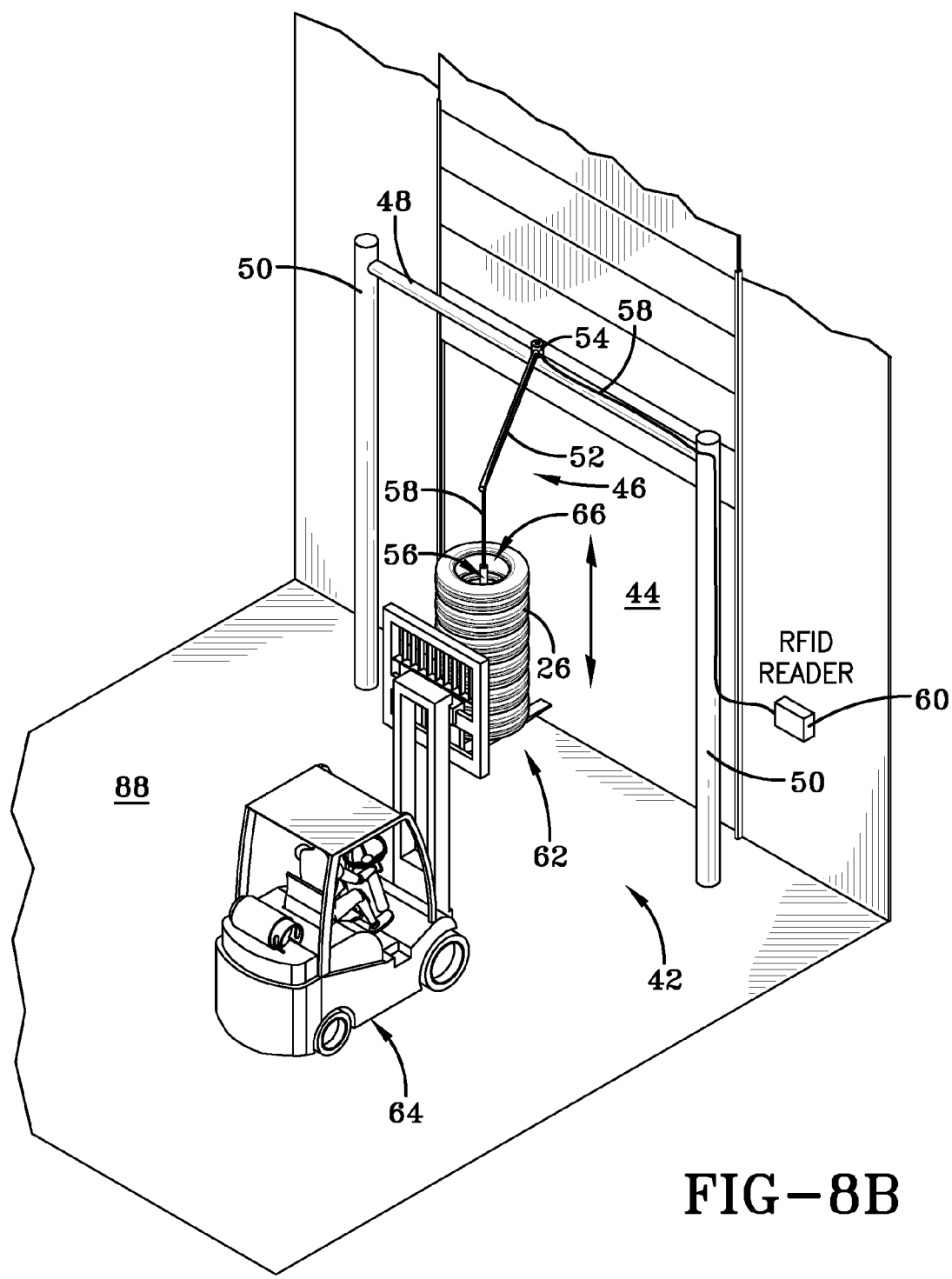
FIG. 8B is a perspective view of forklift lifting tires around hanging antenna for scanning.
Figure 9A:
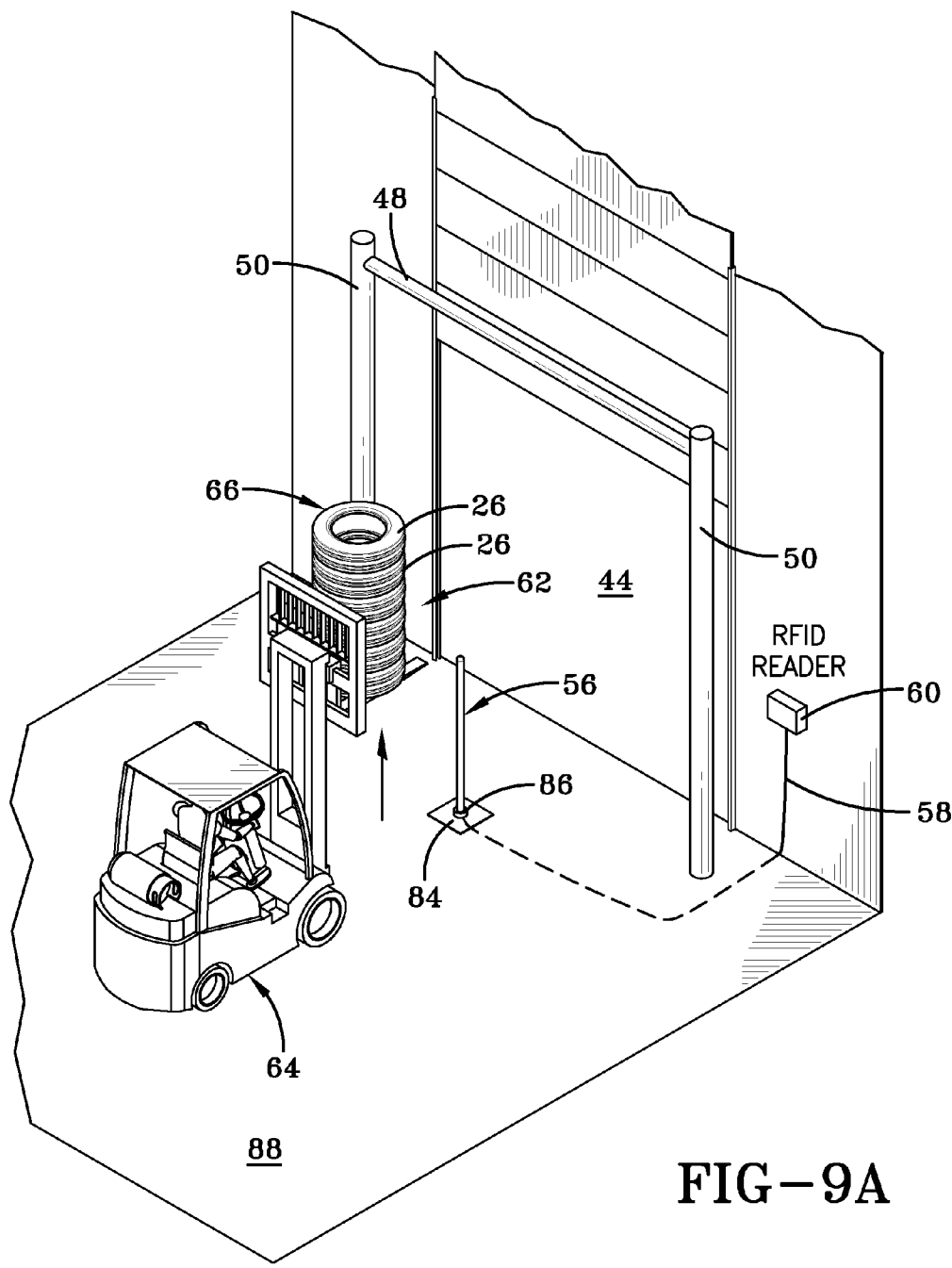
FIG. 9A is a perspective view of forklift with tire stack and floor-mounted rigged antenna.
Figure 9B:
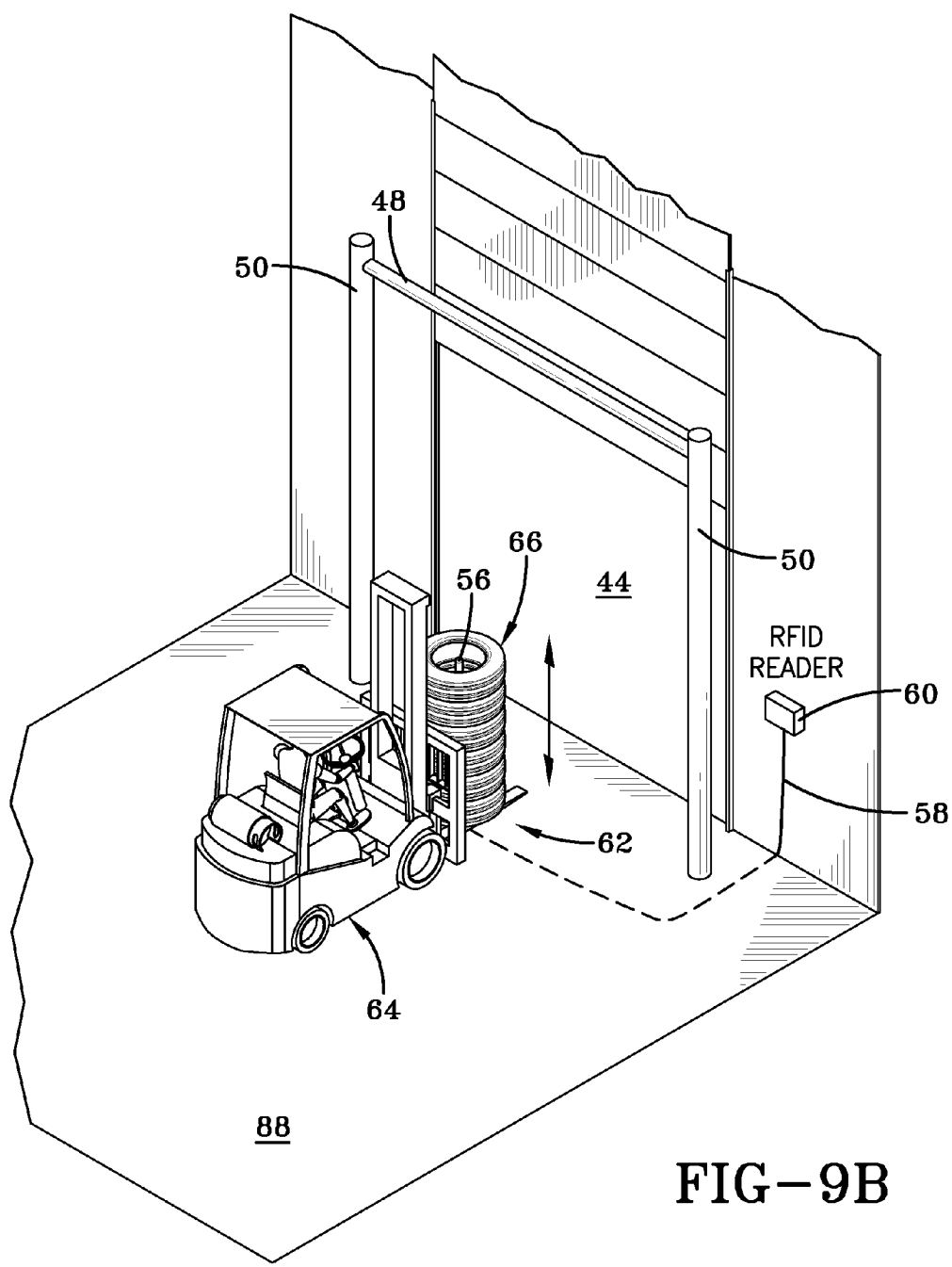
FIG. 9B is a perspective view of forklift lifting tires around floor-mounted rigged antenna for scanning.

With reference to FIGS. 8A, 8B, 9A and 9B, a system for tracking tires throughout the manufacturing and supply chain channels is shown in alternative embodiments. In the FIGS. 8A and 8B embodiment, the system deploys a "hanging" or "chandelier" reader approach while the embodiment of FIGS. 9A and 9B show a floor mounted configuration. Tires equipped with RFID tags are generally transported within manufacturing facilities in groups, such as stacked up to ten feet high on a forklift. It is desirable but technically difficult to be able to track tires passing through a manufacturing plant or warehouse while stacked on forklifts because the carbon in tires may cause the effective RFID tag performance range to degrade significantly. This requires placing read antennas very close to tires and the tags carried by the tires. The system and method represented in FIGS. 8A, 8B, 9A and 9B overcomes the limited read distance of RFID tags in tires by providing a read station having tag-reading apparatus mounted therein by which a reading of tire based RFID tags may be predictably achieved.

As seen in FIGS. 8A, 8B, the read station 42 represents a location within a manufacturing, distribution, or warehouse facility wherein the identification of tires by RFID is desired. The station 42 may include, although not necessarily, a drive through opening or portal 44. A read wand assembly 46 hangs into the read station 42 and is suspended by a cross-beam 48, supported by a pair of support posts 50. The assembly 46 includes a swing arm 52 which is coupled to the cross-beam 48 by a pivot coupling 54. The swing arm 52 thus selectively pivots vertically between raised and lowered positions within the read station 42. The assembly 46 further includes an elongate read wand 56 suspended from the swing arm 52 so as to place a longitudinal axis of the read wand 56 in a generally vertical orientation within the read station. The read wand 56 is electrically serviced and suspended by cabling 58 that extend from the read wand through the swing arm 52 and along a designated path to a remote RFID reader 60. The read station 42 is sized to accommodate receipt of a vertically aligned tire stack 62 therein, placed at a read location within the station 42 by suitable means such as a forklift truck 64. The vertical stack 62 of tires aligns top accessible toroidal openings 66 through the tires 26 within the stack.

Figure 5:
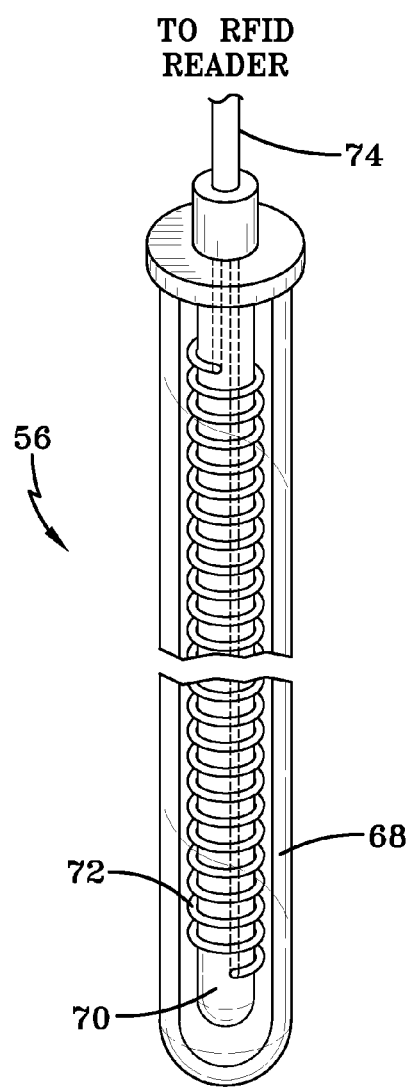
FIG. 5 is a perspective view of rigged antenna embodiment used in FIGS. 8A, 8B, 10A, 10B, 11, 12A, 12B and 13.
Figure 6:
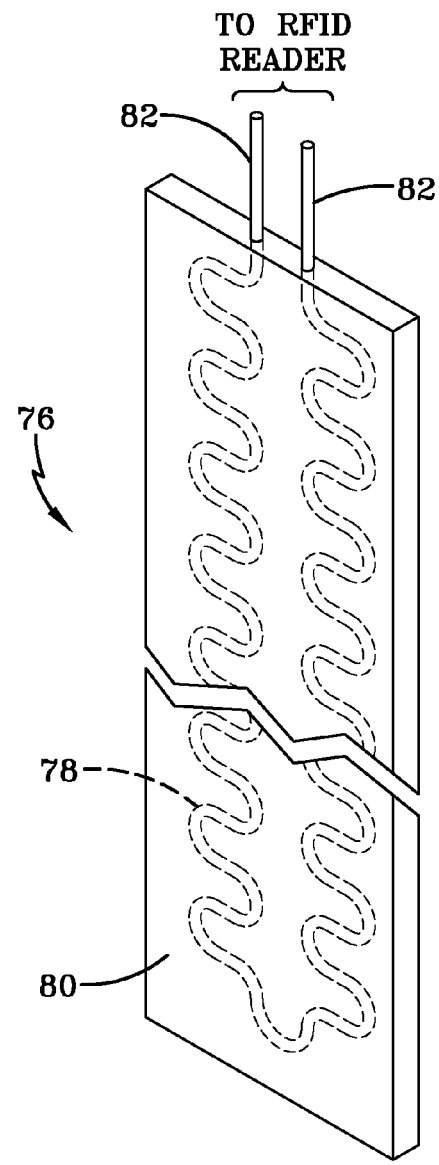
FIG. 6 is a perspective view of flexible hanging antenna used in FIGS. 9A and 9B.

Alternative embodiments of the read wand 56 are shown in FIGS. 5 and 6. In FIG. 5, a rigid embodiment of a read wand is shown having an elongate tubular casing 68 in which a support rod 70 is positioned. A coil antenna 72 extends along the support rod 70 and is likewise encased within the casing 68. Cabling 74 electrically conduct signals to and from the antenna 72 and are routed back to the RFID reader 60 as described previously. In FIG. 6, an alternative embodiment of a read wand is shown configured as a flexible strip 76. The strip 76 includes an antenna 78 encased within an outer sheath 80. The sheath 80 may be formed unitarily around the antenna or as laminate strips which are assembled around the antenna 78 to form the casing. Leads or cabling 82 extend from the antenna 78 back to the RFID reader 60 in the manner previously described.

Figure 10:
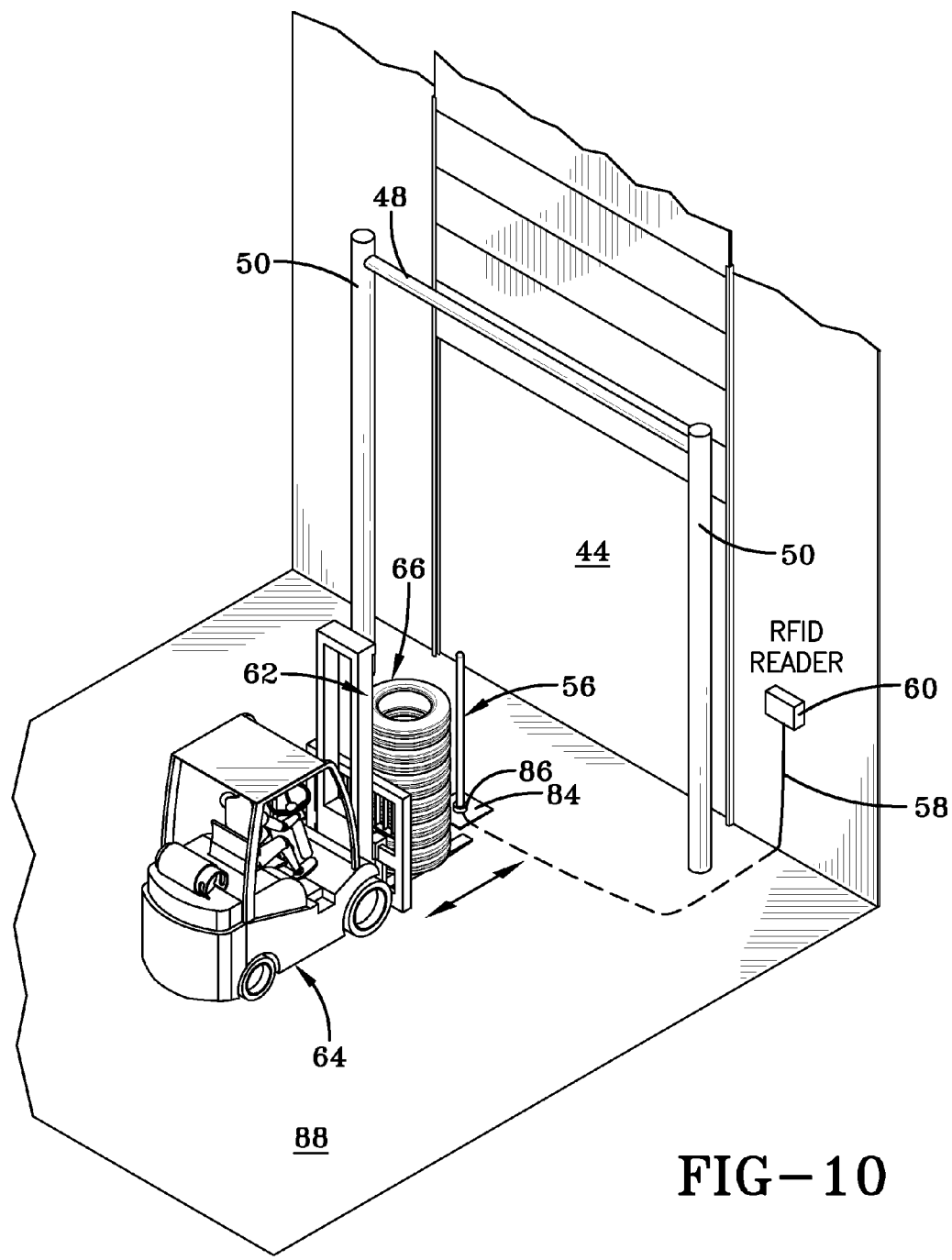
FIG. 10 is a perspective view of forklift with tire stack moving toward floor-mounted rigged antenna for scanning.

FIGS. 9A, 9B, and 10 show an alternatively configured read station in which the read wand assembly is mounted to a floor 88 of the station. A floor-mounted stand 84 is provided with a connector or socket 86 and the read wand 56 is mounted to the stand 84 by means of the socket 86. The read wand 56 thus projects vertically upward within the read station in the manner shown. For the chandelier, or suspended read wand configuration of FIGS. 8A and 8B, it will be appreciated that the tire stack 62 is moved into the station by truck 64 and positioned centrally beneath the suspended read wand 56. The stack is then lifted to place the read wand 56 into the aligned toroidal openings of the tires within the stack 62. Once positioned within the toroidal openings fully, as seen in FIG. 9B, the antenna within the read wand 56 effectively receives a data transmission from each of the RFID tags within the stack and transmits the data to the RFID reader 60. Once a reading is completed, the stack 62 may be lowered by the truck 64 and relocated out of the read station 42.

For the embodiment of FIGS. 9A, 9B and 10, the truck 64 brings the stack 62 into the read station in a lowered position (FIG. 10) until adjacent the read wand 56. The stack is then placed into a raised position by the truck which then moves the stack forward (FIG. 9A) and centers the stack toroidal openings 66 over the read wand 56. The stack is then lowered (FIG. 9B) over the wand 56. The RFID information is transmitted from each RFID tag to the antenna of wand 56 and to the reader 60. Upon completion of the read cycle, the stack is lifted and transported from the read station by the truck 64.

Figure 11A:
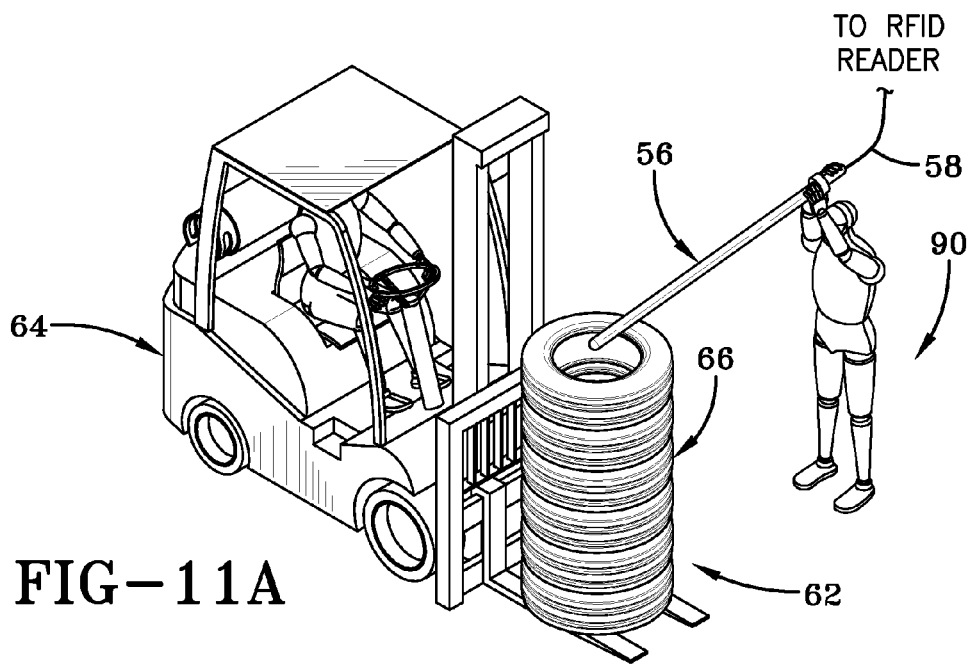
FIG. 11A is a perspective view of forklift with tire stack and handheld wand antenna.
Figure 11B:
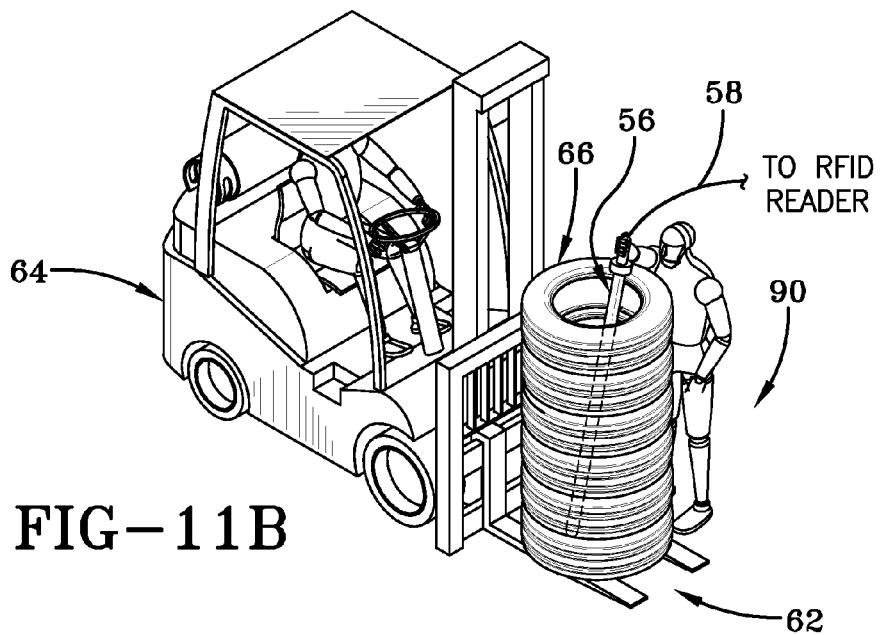
FIG. 11B is a perspective view of forklift with tire stack and handheld wand antenna placed inside tire stack for scanning.
Figure 12:
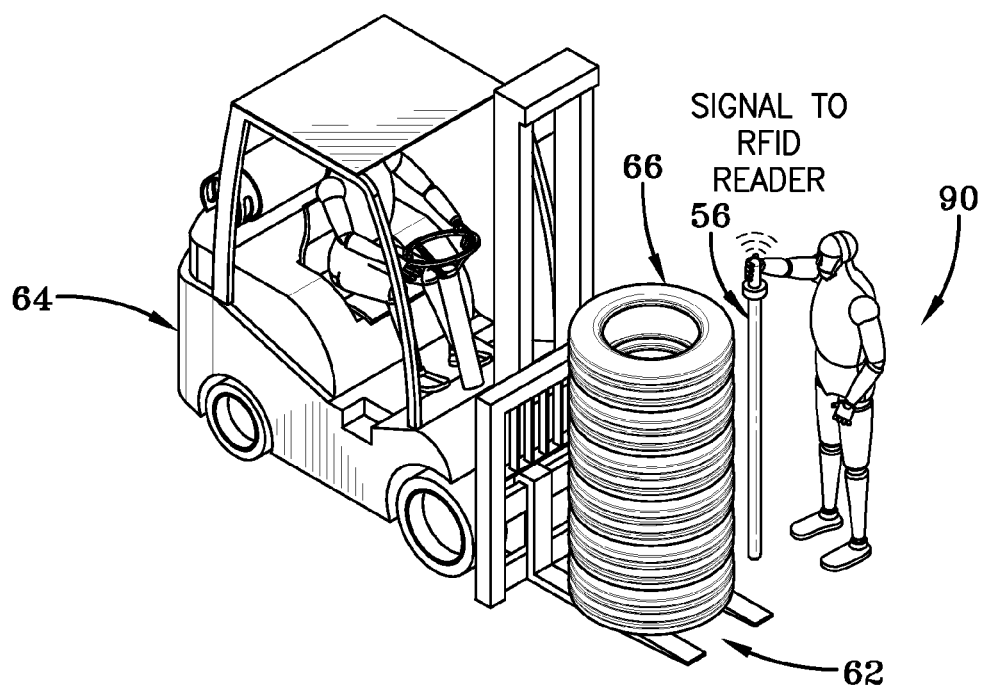
FIG. 12 is a perspective view of forklift with tire stack and wireless handheld wand scanning the tire stack.

FIG. 11A and FIG. 11B show a handheld embodiment of the read station. The read wand 56 is carried by a user 90 who manually places the wand into the toroidal openings 66 of the stack 62 (FIG. 11A). Once fully inserted (FIG. 11B), a reading transmission is established between the tire stack RFID tags and the antenna within the wand 56 and the data transmission is communicated to the RFID reader. Upon completion of the read sequence, the wand 56 is removed and used subsequently on the next stack. In FIG. 12, the handheld wand 56 includes a wireless transmitter to transmit the RFID data to a remote reader wirelessly. In FIG. 12, the wand is placed externally along the stack of tires and the data transmission is made to the antenna carried by the wand. In practice, a redundant procedure may be employed in which a combination of both an external and an internal data transmission reading may be effected, if desired, in order to ensure that the RFID data from the tire tags is completely captured.

Figure 7:
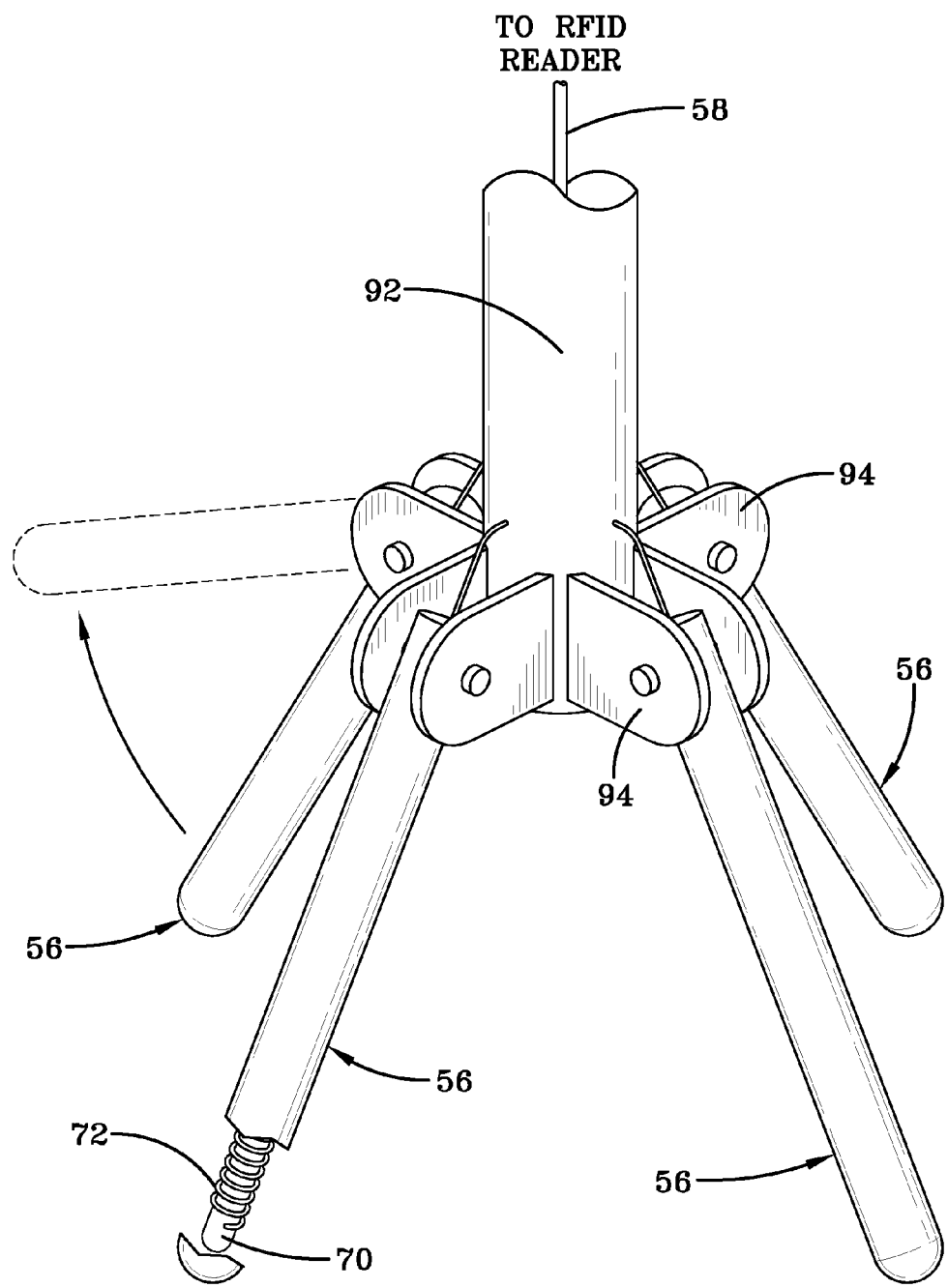
FIG. 7 is a perspective view of fixed chandelier type hanging antenna with pivoting probes used in FIGS. 14A and 14B.
Figure 13A:
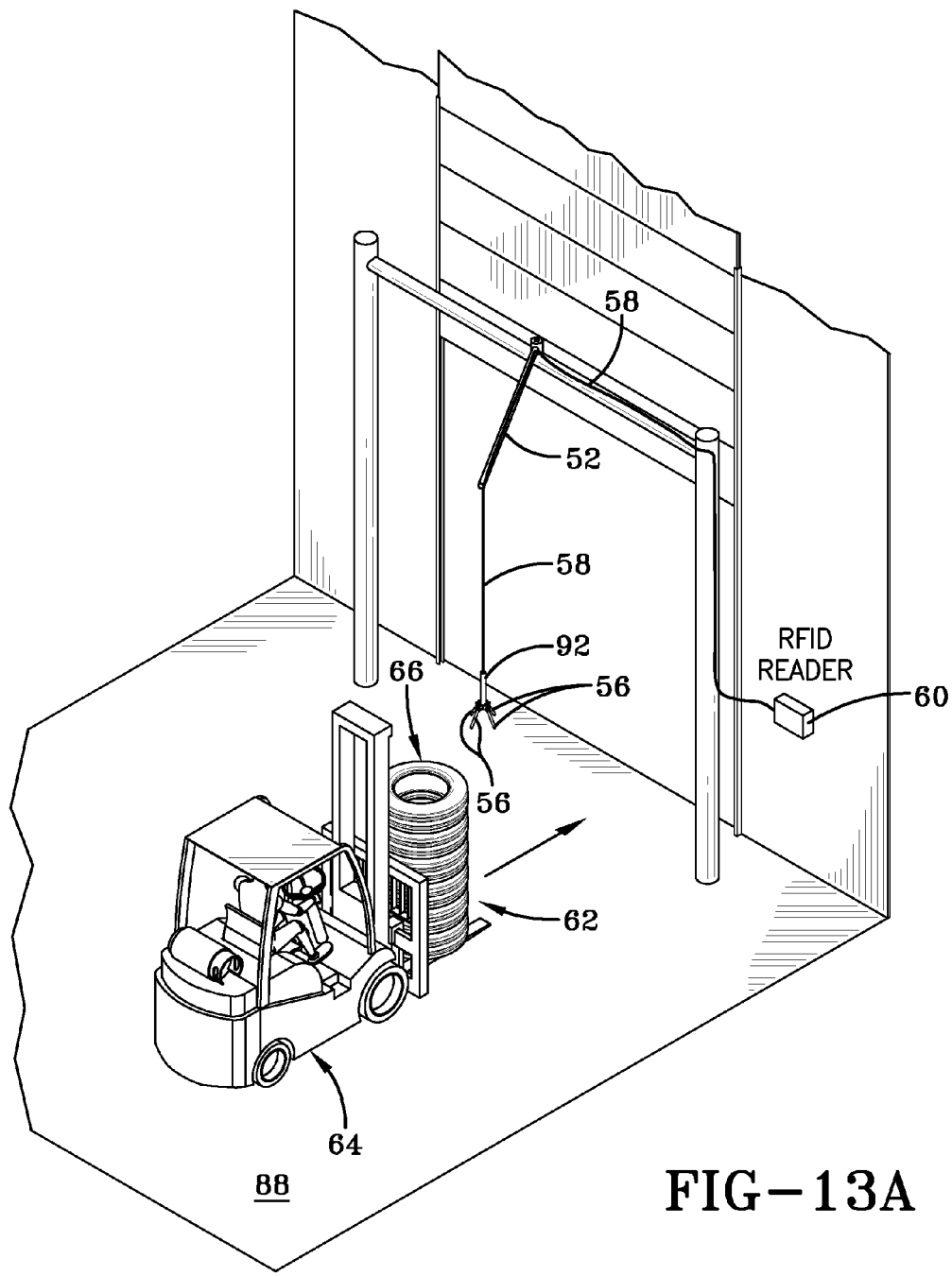
FIG. 13A is a perspective view of forklift with tire stack and a fixed chandelier type hanging antenna mounted from a swing arm attached to door frame.
Figure 13B:
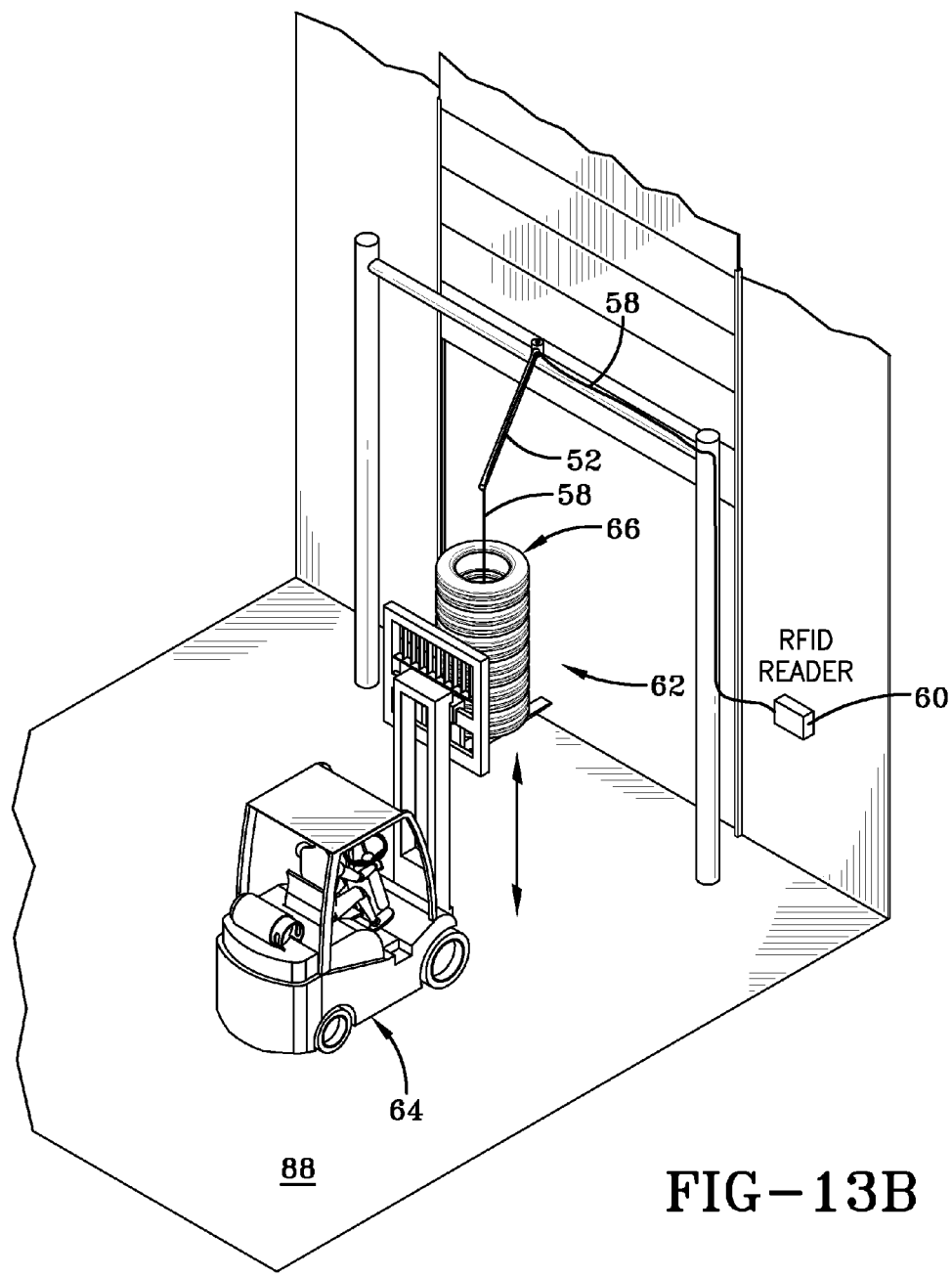
FIG. 13B is a perspective view of forklift lifting tires around fixed chandelier type hanging antenna for scanning.

In FIGS. 7, 13A and 13B, yet another embodiment is shown in which an array of four read wands 56 are mounted to a central connector post 92. Each of the wands 56 is configured as described previously, having a central support 70 and an antenna 72 coiled around the post 70. The four wands 56 pivotally move between the extended "up" position shown in phantom in FIG. 7 and the retracted "down" position shown in solid line The four wands 56 are pivotally mounted to the center post 92 by brackets 94. The stack of tires is moved into the read station and located centered beneath the wand 56 (FIG. 13A). The wand array is in a raised position as previously explained in reference to FIGS. 8A and 8B with the four wands 56 in the "down", retracted position. With the wands 56 folded downward, the wand assembly may be received with clearance into the aligned toroidal passageways of the stack as the truck 64 lifts the stack (FIG. 13B). Thereafter, the wands 56 may be folded up into the "up", extended position as seen in phantom in FIG. 7, to bring the antennae 72 against the bottom of the stack. The read wands 56 are thus centered within the toroidal openings of the stack 62 for the RFID tag read transmission.

From the foregoing, it will be appreciated that a toroidal product management system is effectively provided for reading an electronic identification tag for a single toroidal manufactured product such as a tire, or a vertical stack of such products. The RFID tag secured to each tire operatively electronically transmits data to an antenna element positioned internally within a toroidal opening of the tire stack by means of wand 56. The elongate read wand 56 is positioned in a substantially vertical orientation within the read station, either in a chandelier mounting, a floor mount, or handheld, and is sized to operatively extend into the aligned toroidal openings of the tire. The length of the wand 56 and the antenna carried by the wand is sufficient to extend the length of the stack 62 either from inside the aligned toroidal passageways or along the outside as shown in FIGS. 11A and 11B. The antenna element carried by the read wand is thus proximally positioned to receive the electronic transmission from each electronic identification tag within the aligned tire stack.

Moreover, it will be appreciate that the system is flexible in that the read wand 56 may at the election of the user be mounted in chandelier fashion to hang from the ceiling of the read station; floor mounted to project upwardly from the floor of the read station; or handheld. The read wand carrier body may be alternatively configured as a flexible strip in which the antenna element is embedded within a flexible sheath or as an elongate rigid body supporting the antenna element.

The method of operation includes positioning the stack of tires within the read station with the toroidal openings of the tires in the stack aligned with the read wand 56 and either raising the stack or lowering the read wand to position the wand within the stack in a read position. The antenna element carried by the wand is thus positioned to couple with the RFID tags within the stack and receive a transmission of identification data from each tag.

Thus, the reader system and apparatus effectively places the read antenna close enough to excite the tags within the stack. The system read station may be deployed within a manufacturing or warehouse location or any other stop in the distribution channel without the need for expensive or cumbersome modifications. The antenna system is compatible with conventional and commercially available readers/eNodes, making the toroidal product management system cost effective to implement, service and operate. While tires are the exemplary products used in the foregoing description, the system may be adapted and used for other toroidal stacked product categories where transportation of products carrying a RFID tag(s) are routed in the course of manufacture or subsequent distribution and where an identification of such products by RFID tag transmission is needed.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A toroidal product management system for reading an electronic identification tag, comprising:
   a plurality of toroidal manufactured products individually aligned within a moveable vertical stack, each manufactured product having the electronic identification tag secured to the manufactured product, the identification tag positioned to operatively electronically transmit data to an antenna element positioned within a toroidal opening of the manufactured product;
   a read station positioned to accept the moveable vertical stack therein,
   an elongate read wand positioned within the read station in a substantially vertical orientation, the read wand sized lengthwise to operatively simultaneously extend into the toroidal opening of each manufactured product within the read station;
   the antenna element being secured to the read wand and positioned by the read wand within the toroidal openings at a location operative to receive an electronic transmission from the electronic identification tag of each manufactured product within the vertical stack.

2. The toroidal product management system according to claim 1, wherein the electronic identification tag comprises an RFID identification tag.

3. The toroidal product management system according to claim 1, wherein further comprising an electronic reader coupled to receive the electronic transmission from the antenna element.

4. The toroidal product management system according to claim 1, wherein the antenna element selectively moves in and out of the toroidal opening.

5. The toroidal product management system according to claim 4, wherein the read wand and antenna element have a complementarily elongate configuration of a length sufficient to extend from a top manufactured product to a bottom manufactured product within the vertical stack, whereby substantially ensuring establishment of a proximal reading relationship between the antenna element and the electronic identification tags with the antenna element located in a fixed reading position within the toroidal openings of the plurality of manufactured products within the vertical stack.

6. The toroidal product management system according to claim 5, wherein the read wand comprises: an elongate carrier body having a longitudinal axis, the antenna element being secured to the carrier body; and the read wand further comprising electrical conductors coupled to the antenna element.

7. The toroidal product management system according to claim 6, wherein the longitudinal axis of the elongate read wand carrier body is positioned in a substantially vertical orientation within the read station by alternative positioning fixtures, the positioning fixtures taken from a group consisting:
   (A) an overhead fixture suspending the carrier body lengthwise into the read station;
   (B) a floor-mounted fixture supporting the carrier body to extend lengthwise upward from a floor surface into the read station; and
   (C) a handheld handle means operative to enable a user to carry the carrier body in and out of the toroidal opening by hand.

8. The toroidal product management system according to claim 7, wherein the read wand carrier body is alternatively configured from a group consisting:
   (A) a flexible strip in which the antenna element is at least partially embedded; and
   (B) an elongate substantially rigid body supporting the antenna element.

9. A method of managing toroidal product identification by reading an electronic identification tag, comprising:
   attaching an electronic identification tag to each of a plurality of toroidal products at a position operative to electronically transmit data to an antenna element, the toroidal products each having a toroidal opening therethrough;
   stacking the plurality of toroidal products into a vertical stack aligning the toroidal openings of the toroidal products;
   positioning a read station to accept the vertical stack of toroidal products therein;
   positioning an elongate read wand within the read station, the read wand having an antenna element secured thereto to receive an electronic transmission from the electronic identification tags of the plurality of toroidal products;
   positioning the read wand within the toroidal openings of the toroidal products within the vertical stack, the read wand having a lengthwise dimension extending from an uppermost toroidal product within the vertical stack to a lowermost product within the vertical stack; and
   placing the antenna element of the read wand into a reading proximity with the identification tags of the stacked toroidal products, with the antenna element located in a fixed reading position within the toroidal openings of the plurality of toroidal products within the vertical stack.

10. The method of claim 9, further comprising moving the antenna element selectively in and out of the fixed reading position within the toroidal openings of the vertical stack by means of the read wand.

11. The method of claim 9, further comprising moving the stacked toroidal products to receive the read wand into the toroidal openings of the stacked toroidal products.

12. The method of claim 11, further comprising aligning the toroidal openings of the stacked toroidal products over the read wand; and lowering the toroidal products over the read wand to place the read wand within the toroidal openings of the stacked toroidal products.

13. The method of claim 12, further comprising aligning the aligned toroidal openings of the stacked toroidal products beneath the read wand; and raising the stack of toroidal products to place the read wand within the aligned toroidal openings of the toroidal products.

* * * * *